(12) United States Patent
Zhang et al.

(10) Patent No.: US 11,794,123 B1
(45) Date of Patent: Oct. 24, 2023

(54) ELECTRIC MOTOR AND ELECTRIC TOY

(71) Applicant: SHENZHEN HOBBYWING TECHNOLOGY CO., LTD., Shenzhen (CN)

(72) Inventors: Xianggui Zhang, Shenzhen (CN); Qiao Lin, Shenzhen (CN); Zhipeng Ji, Shenzhen (CN)

(73) Assignee: SHENZHEN HOBBYWING TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/983,096

(22) Filed: Nov. 8, 2022

(30) Foreign Application Priority Data

Apr. 26, 2022 (CN) .......................... 202210443911.6

(51) Int. Cl.
*H02K 1/16* (2006.01)
*H02K 5/04* (2006.01)
*H02K 1/28* (2006.01)
*H02K 1/27* (2022.01)
*A63H 29/22* (2006.01)

(52) U.S. Cl.
CPC ............. *A63H 29/22* (2013.01); *H02K 1/165* (2013.01); *H02K 1/27* (2013.01); *H02K 1/28* (2013.01); *H02K 5/04* (2013.01)

(58) Field of Classification Search
CPC .......... A63H 29/22; H02K 1/165; H02K 1/27; H02K 1/28; H02K 5/04
See application file for complete search history.

(56) References Cited

U.S. PATENT DOCUMENTS

| 4,930,201 A | * | 6/1990 | Brown | .................... H02K 1/278 |
| | | | | 310/156.28 |
| 2010/0019626 A1 | * | 1/2010 | Stout | ........................ H02K 3/50 |
| | | | | 310/214 |

FOREIGN PATENT DOCUMENTS

| CN | 102480204 A | 5/2012 | |
| CN | 111641279 A | 9/2020 | |
| CN | 213906400 U | 8/2021 | |
| WO | WO-2007113057 A1 * | 10/2007 | ............. H02K 1/278 |

\* cited by examiner

*Primary Examiner* — Bernard Rojas
(74) *Attorney, Agent, or Firm* — Dragon Sun Law Firm, PC; Nathaniel Perkins

(57) ABSTRACT

An electric motor and an electric toy, wherein the electric motor includes a stator assembly, a rotor assembly, a front end cover assembly, a rear end cover assembly, a three-phase power line, and a data transmission line. The rotor assembly is sleeved on the stator assembly. The rotor assembly includes a magnetic ring, a magnetic knitting frame, an iron core, several tile-shaped magnets, a rotating shaft, and a rotor end plate. A positioning slot is arranged between adjacent tile-shaped magnets. The magnetic knitting frame is provided with a positioning boss that is inserted into the structure of the positioning slot. The electric motor allows the accurate positioning and assembling of the rotor assembly, so that the magnetic poles of the magnetic ring correspond to the magnetic poles of the tile-shaped magnet.

14 Claims, 4 Drawing Sheets

ELECTRIC MOTOR AND ELECTRIC TOY

CROSS-REFERENCE TO RELATED APPLICATION

This application claims priority from the Chinese patent application 202210443911.6 filed Apr. 26, 2022, the content of which is incorporated herein in the entirety by reference.

TECHNICAL FIELD

The disclosure pertains to the technical field of electric motors, in particular to an electric motor and an electric toy.

BACKGROUND

The electric motor is a device that converts electrical energy into mechanical energy. The electric motor comprises a rotor and a stator. The electric motor employs energized coils (i.e. stator winding) to generate a rotating magnetic field which acts on the rotating magnetic field (such as a closed aluminum frame in a type of squirrel-cage) and produces the magneto-electric rotational torque. As a type of electric motors, the brushless induction motor boasts great low-speed linearity and starting torsion. Therefore, it is more extensively applied in various scenarios.

In the process of implementing this disclosure, the inventor found that the induction components in the brushless induction motor are able to sense the position of the rotor, and to commutate the power supply to the stator by outputting signals and digits to the controller. However, in the prior art, the low positioning accuracy of the rotor directly affects the performance of brushless induction motors.

SUMMARY

The disclosure aims to address a technical problem by providing an electric motor and an electric toy that can accurately position and assemble the rotor assembly, and correspond the magnetic poles of magnetic ring to the magnetic poles of tile-shaped magnets. This improves the positioning accuracy of the rotor assembly of the motor, enhances the accuracy of the induction components used for sensing the tile-shaped magnet, and improves the performance of the electric motor.

To address the aforesaid technical issue, the disclosure proposes a technical solution: it provides an electric motor that comprises a stator assembly, a rotor assembly, a front cover assembly, a rear cover assembly, a three-phase power line and a data transmission line. The stator assembly includes a housing and a winding. The housing is provided with a receiving cavity, and the winding is contained in the receiving cavity; the rotor assembly is sleeved in the winding. The rotor assembly includes a magnetic ring, a magnetic knitting frame, an iron core, several tile-shaped magnets, a rotating shaft, and a rotor end plate. The iron core is sleeved on the rotating shaft and is provided with a first installation slot. A positioning slot is arranged between two adjacent tile-shaped magnets. The rotor end plate is sleeved on the rotating shaft, and is located at the first end of the iron core. The magnetic knitting frame is sleeved on the rotating shaft, and is located on the second end of the iron core. One end of the magnetic knitting frame is provided with a positioning boss which is inserted into the positioning slot. The magnetic ring is arranged on the other end of the magnetic knitting frame; the front end cover assembly comprises a front end fastener and a front cover plate. The front cover plate is arranged on the first end of the housing, and the front end fastener is used for fixing the front cover plate on the housing; the rear end cover assembly includes a rear end fastener, induction components, and a rear cover plate; the induction components are arranged on the rear cover plate, and used for sensing the magnetic ring. The rear end fastener is used for fixing the rear cover plate on the second end of the housing; the three-phase power line is electrically connected to the winding; one end of the data transmission line is electrically connected to the induction components and the other end of data transmission line is electrically connected to an external ESC device.

Optionally, the iron core is provided with the first straight portion; the rotating shaft includes a first section, a second section and a third section; the first section and the third section are respectively located at both ends of the second section; the second section is provided with a second straight portion; the first straight portion is connected to the second straight portion so as to locate the iron core on the second section of the rotating shaft; the rotor end plate is sleeved on the first section, and the magnetic knitting frame is sleeved on the third section.

Optionally, the second section is provided with an adhesive slot. The end of the first section adjacent to the second section is provided with a first rib. The end of the third section adjacent to the second section is provided with a second rib. The adhesive slot as well as the first and second ribs are all used to store adhesive.

Optionally, the other end of the magnetic knitting frame is provided with a second installation slot, and the bottom of the second installation slot is provided with a positioning hole; the magnetic ring is arranged at the second installation slot, and is provided with a positioning strut. The positioning strut is inserted into the positioning hole. The magnetic poles of the magnetic ring correspond to the magnetic poles on the outer surface of the tile-shaped magnet.

Optionally, the rotor assembly further includes aramid fiber which is wound around the outer surface of the tile-shaped magnet; the rotor end plate is provided with the first wire-embedding slot; the magnetic knitting frame is provided with the second wire-embedding slot, a wire outlet and a threaded hole. The wire outlet is arranged on the wall of the second wire-embedding slot. The first and second wire-embedding slots are used for accommodating the initial and final sections of the aramid fiber, respectively. The final section of the aramid fiber goes through the wire outlet and is fixed to the threaded hole after being led out.

Optionally, the rotor assembly further includes a first dynamic balancing member and a second dynamic balancing member. The first and second dynamic balancing members are arranged on the rotor end plate, and on the magnetic knitting frame, respectively.

Optionally, the front end cover assembly further includes a first bearing which is arranged on the front cover plate, and is used for supporting the first section of the rotating shaft. The rear end cover assembly further includes a second bearing which is arranged on the rear cover plate, and is used for supporting the third section of the rotating shaft.

Optionally, the electric motor further includes a preloading structure disposed between the rotor assembly and the front end cover assembly. The preloading structure serves as a cushion for the axial movement of the rotor assembly.

Optionally, the preloading structure includes a first gasket and an elastic gasket, which are both sleeved on the rotating shaft. The first gasket abuts the first bearing, and the elastic gasket abuts the rotor end plate.

To address the aforesaid technical issue, the disclosure proposes another technical solution: it provides an electric toy, comprising the aforesaid electric motor which powers the electric toy.

The present disclosure has the following beneficial effects: The electric motor includes a stator assembly, a rotor assembly, a front end cover assembly, a rear end cover assembly, a three-phase power line, and a data transmission line. The rotor assembly is sleeved in the stator assembly. The front end cover assembly and the rear end cover assembly are disposed on both ends of the stator assembly, respectively. The two ends of the three-phase power line are electrically connected to the stator assembly and the external power supply, respectively. The two ends of the data transmission line are electrically connected to the rear end cover assembly and the external ESC device, respectively. The rotor assembly includes a magnetic ring, a magnetic knitting frame, an iron core, several tile-shaped magnets, a rotating shaft and a rotor end plate. The iron core is sleeved on the rotating shaft, and is provided with a first installation slot. The tile-shaped magnet is arranged in the first installation slot. The positioning slot is arranged between two adjacent tile-shaped magnets. The rotor end plate is sleeved on the rotating shaft, and is located on the first end of the iron core. The magnetic knitting frame is sleeved on the rotating shaft, and is located on the second end of the iron core. One end of the magnetic knitting frame is provided with a positioning boss which is inserted into the positioning slot. The magnetic ring is arranged on the other end of the magnetic knitting frame, so that the magnetic poles of the magnetic ring corresponds to those of the tile-shaped magnets. The rear end cover assembly includes induction components which are used to sense the magnetic pole information of the magnetic ring and the tile-shaped magnet and to send the information to the external ESC device. The external ESC device may adjust the power supply of the external power source to the stator assembly according to the magnetic pole information. A positioning slot is arranged between adjacent tile-shaped magnets. The magnetic knitting frame is provided with a positioning boss that is inserted into the structure of the positioning slot. The electric motor allows the accurate positioning and assembling of the rotor assembly, so that the magnetic poles of the magnetic ring correspond to the magnetic poles of the tile-shaped magnet. This improves the positioning accuracy of the rotor assembly of the motor, enhances the accuracy of the induction components used for sensing the tile-shaped magnet, and improves the performance of the electric motor.

BRIEF DESCRIPTION OF DRAWINGS

In order to elaborate the specific embodiments of the present disclosure or the technical solutions in the prior art more explicitly, the accompanying drawings in the presentation of the specific embodiments or the prior art will be briefly introduced below. Identical elements or portions are generally identified by similar reference numerals in all drawings. In the drawings, each element or section is not necessarily drawn to actual scale.

DETAILED DESCRIPTION OF THE PRESENT INVENTION

To facilitate understanding of the disclosure, the disclosure will be described in more detail below in conjunction with the accompanying drawings and embodiments. It should be noted that when an element is referred to as being "fixed to" another element, it may be directly placed on the other element, or one or more elements may be located therebetween. When an element is referred to as being "connected" to another element, such element may be directly attached to another element or one or more elements may be located therebetween. In the description of the present Specification, the terms that indicate the relationship of orientation or position such as "upper," "lower," "inside," "outside," "vertical," and "horizontal" are based on the relationship of orientation or position shown in the accompanying drawings. This is meant to facilitate and simplify the description of the present disclosure and not to imply that the indicated device or element shall have a specific orientation or shall be constructed and operated in a particular orientation. Therefore, it shall not be interpreted as a limitation of the present disclosure. Furthermore, the terms "first" and "second" are used for description only and shall not be construed to indicate or imply relative importance.

Unless otherwise defined, all technical and scientific terms used in the Specification shall have the same meaning as commonly understood by those skilled in the technical field of this disclosure. The terms used in the Specification of the present disclosure are only for the purpose of specially describing, rather than restricting the disclosure. The term "and/or" in the Specification, includes any and all combinations of one or more of the associated listed items. In addition, the technical features stated in the present disclosure below can be combined with each other, as long as they do not conflict with each other.

Figure 1:
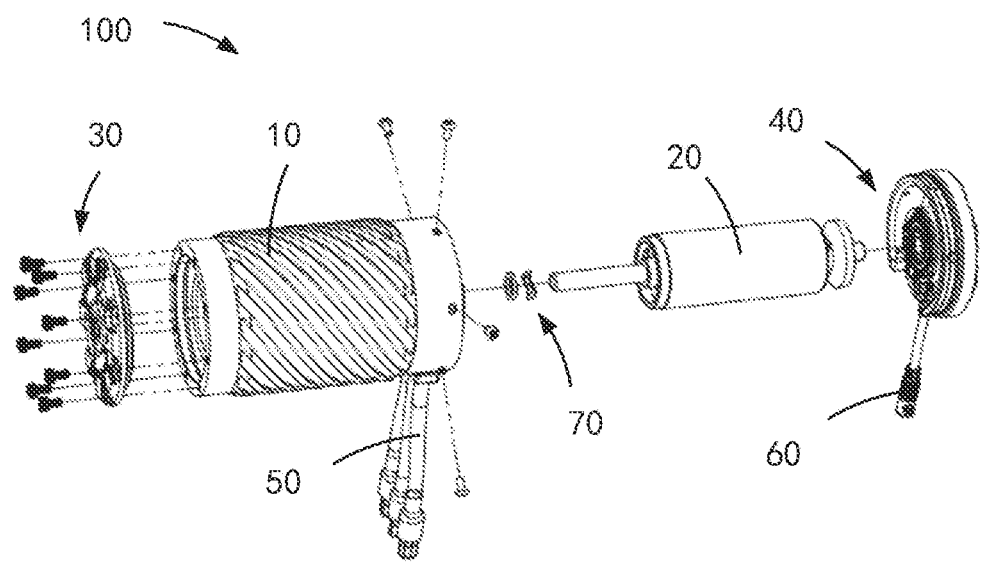
FIG. 1 is the exploded view of the motor of the present disclosure.

According to the FIG. 1, the motor (100) includes a stator assembly (10), a rotor assembly (20), a front end cover assembly (30), a rear end cover assembly (40), a three-phase power line (50), and a data transmission line (60). The rotor assembly (20) is accommodated in the stator assembly (10). The front end cover assembly (30) is arranged at the first end of the stator assembly (10). The rear end cover assembly (40) is arranged at the second end of the stator assembly (10). The front end cover assembly (30) and the rear end cover assembly (40) are both used for supporting the rotor assembly (20) so that the rotor assembly (20) may rotate relative to the stator assembly (10). One end of the three-phase power line (50) is electrically connected to the stator assembly (10), and the other end of the three-phase power line (50) is electrically connected to an external power supply. The power line (50) supplies the three-phase electricity with variable direction to the stator assembly (10), and generates a variable magnetic field to drive the rotation of the rotor assembly (20). One end of the data transmission line (60) is electrically connected to the rear end cover assembly (40), and the other end of the data transmission line (60) is electrically connected to an external ESC device. The rear end cover assembly (40) is used to sense the magnetic pole information of the rotor assembly (20) and to deliver the information to the ESC device through the data transmission line (60). The ESC device controls any changes to the three-phase electricity of external power source according to the magnetic pole information of the rotor assembly (20).

Figure 2:
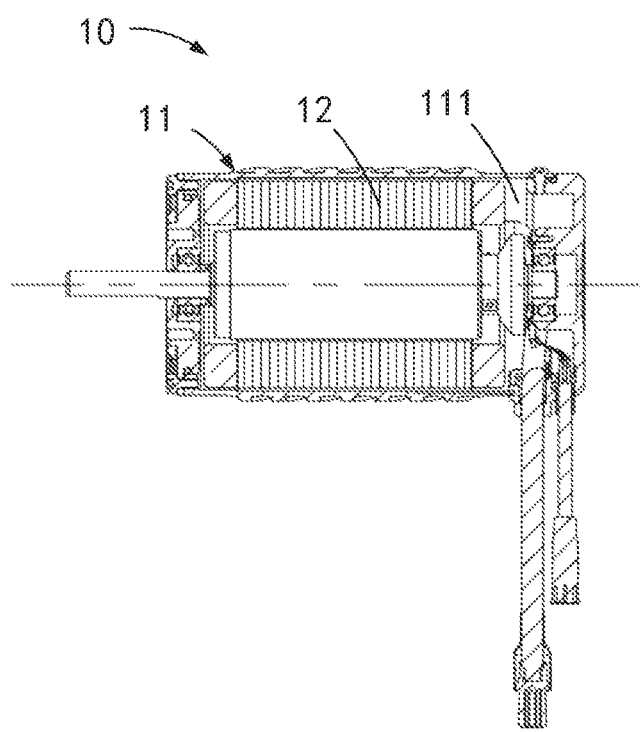
FIG. 2 is the sectional view of the motor of the present disclosure.

With respect to the above-mentioned stator assembly (10), please refer to the FIG. 2. The stator assembly (10) includes a housing (11) and a winding (12). The housing (11) is provided with a receiving cavity (111) whose both ends are communicated with external equipment. The winding (12) is fixedly arranged in the receiving cavity (111), and is electrically connected to the three-phase power line (50). The rotor assembly (20) is sleeved in the winding (12) and rotates relative to the winding (12).

Figure 3:
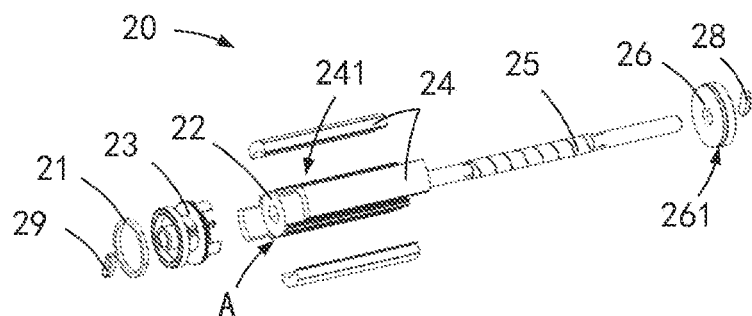
FIG. 3 is the exploded view of rotor assembly in the motor of the present disclosure.
Figure 5:
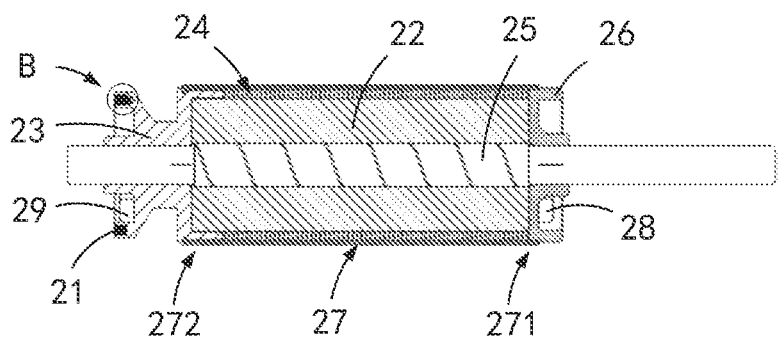
FIG. 5 is a cross-sectional view of the rotor assembly in the motor of the present disclosure.

With respect to the above-mentioned rotor assembly (20), please refer to FIGS. 3 and 5. The rotor assembly (20) includes a magnetic ring (21), an iron core (22), a magnetic knitting frame (23), several tile-shaped magnets (24), a rotating shaft (25), a rotor end plate (26) and aramid fibers (27). The iron core (22) is sleeved on the center of the rotating shaft (25), and the two ends of the rotating shaft (25) are supported by the front end cover assembly (30) and the rear end cover assembly (40), respectively. Several tile-shaped magnets (24) are arranged on the outer surface of the iron core (22), and positioning slots (241) are formed between two adjacent tile-shaped magnets (24). The rotor end plate (26) is sleeved on the rotating shaft (25) and mounted on the first end of the iron core (22). The magnetic knitting frame (23) is sleeved on the rotating shaft (25), and is mounted on the second end of the iron core (22). The magnetic ring (21) is arranged on the magnetic knitting frame (23) which is inserted into the positioning groove (241), so that the magnetic ring (21) correspond to several tile-shaped magnets (24). Starting from the rotor end plate (26), the aramid fiber (27) is wound around the outer surface of the tile-shaped magnets (24) along the direction of the rotor end plate (26) toward the magnetic knitting frame (23). The aramid fiber (27) stops winding and is secured on the magnetic knitting frame (23). The aramid fiber (27) around the outer surface of the tile-shaped magnets (24) can enhance the strength of the tile-shaped magnets (24) and prevent the rotor assembly (20) from explosion due to excessive centrifugal force during the rotation of the tile-shaped magnets (24).

Figure 6:
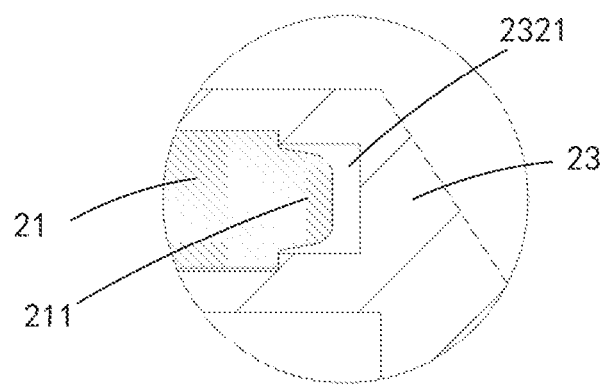
FIG. 6 is the enlarged view of part B in FIG. 5.

Please refer to FIGS. 3 and 6, the magnetic ring (21) takes an annular structure and is provided with two pairs of opposite magnetic poles, respectively, that is, N- and S-poles. A surface of the magnetic ring (21) is provided with the positioning strut (211). The positioning strut (211) is used for mating and connecting with the magnetic knitting frame (23), so that the magnetic ring (21) can be quickly installed on the magnetic knitting frame (23).

Figure 4:
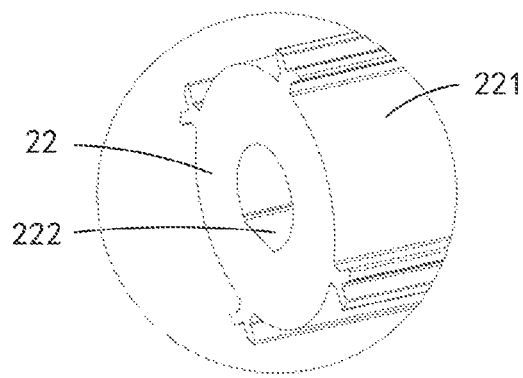
FIG. 4 is the enlarged view of part A in FIG. 3.

Please refer to FIG. 4, the iron core (22) takes the form of a hollow cylinder, and is provided with four first installation slots (221) and a first straight portion (222). Four first installation slots (221) are located on the external surface of the iron core (22). Each first installation slot (221) extends from one end of the iron core (22) to the other end of the iron core (22), and is used for installing a tile-shaped magnet (24). The first straight portion (222) is located on the hollow inner wall of the iron core (22), and is used for mating and connecting with the rotating shaft (25). Thereby the iron core (22) can be quickly positioned and installed on the rotating shaft (25). Moreover, the first straight portion (222) is also able to prevent the iron core (22) from rotating relative to rotating shaft (25) when the rotor assembly (20) rotates at a high speed. Doing so may affect the correspondence between the tile-shaped magnet (24) and the magnetic ring (21) and lower the performance of the motor (100).

In this disclosure, there are four tile-shaped magnets (24), i.e. two N-pole tile-shaped magnets (24) and two S-pole tile-shaped magnets (24), respectively. The two N-pole tile-shaped magnets (24) are oppositely arranged on two first installation slots (221). The two S-pole tile-shaped magnets (24) are oppositely arranged in the remaining first installation slots (221). It should be noted that the magnetic poles of the tile-shaped magnet (24) are located on the outer surface of the tile-shaped magnet (24), and the magnetic pole of the tile-shaped magnet (24) corresponds to the magnetic pole of the magnetic ring (21). In other words, the N-pole of the tile-shaped magnet (24) corresponds to the N pole of the magnetic ring (21), and the S-pole of the tile-shaped magnet (24) corresponds to the S-pole of the magnetic ring (21).

Figure 7:
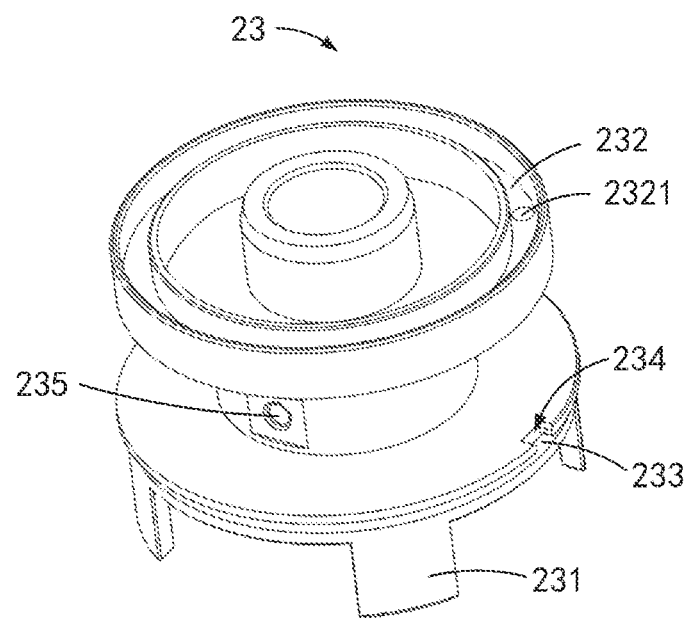
FIG. 7 is the schematic diagram of magnetic knitting frame in the motor of the present disclosure.
Figure 8:
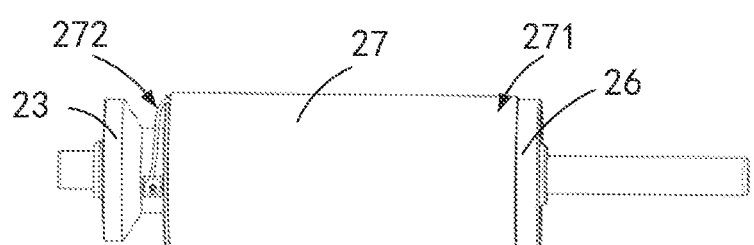
FIG. 8 is the schematic diagram of rotor assembly in the motor of the present disclosure.

Please refer to the FIGS. 7 and 8. The magnetic knitting frame (23) is provided with several positioning bosses (231), the second installation slot (232), the second wire-embedding slot (233), the wire outlet (234), and the threaded hole (235). Several positioning bosses (231) are arranged around one end of the magnetic knitting frame (23) at intervals. The positioning bosses (231) protrude from one end of the magnetic knitting frame (23) to the direction of another end away from the magnetic knitting frame (23). The positioning bosses (231) are used for inserting into the positioning slots (241), so that the magnetic knitting frame (23) can be quickly and accurately installed on the iron core (22). The second wire-embedding slot (233) is also arranged at one end of the magnetic knitting frame (23), and is used for winding the final section (272) of the aramid fiber (27). The wire outlet (234) is arranged on the wall of the second wire-embedding slot (233) and allows the aramid fiber (27) wound in the second wire-embedding slot (233) to lead out. The threaded hole (235) is arranged in the central portion of the magnetic knitting frame (23), and is used for screwing the final section (272) of the aramid fiber (27), so that the final section (272) of the aramid fiber (27) is fixed on the magnetic knitting frame (23). The second installation slot (232) is arranged at the other end of the magnetic knitting frame (23). The bottom of the second installation slot (232) is provided with a positioning hole (2321). The second installation slot (232) is used for installing the magnetic ring (21), and the positioning strut (211) of the magnetic ring (21) is inserted into the positioning hole (2321), so that the magnetic ring (21) can be quickly and accurately installed on the magnetic knitting frame (23). When the positioning struts (211) of the magnetic ring (21) are inserted into the positioning holes (2321) of the second installation slots (232), and the positioning bosses (231) of the magnetic knitting frame (23) are inserted into the positioning slots (241) between the tile-shaped magnets (24), and the magnetic poles of the magnetic ring (21) correspond to the magnetic poles on the outer surface of the tile-shaped magnets (24). This allows the rapid positioning and installation of the magnetic ring (21) and the tile-shaped magnets (24).

It can be understood that the number of the threaded holes (235) may be one, two or more, or optional according to the actual situation. When the number of the threaded holes (235) is two or more, the threaded holes (235) are arranged around the central portion of the magnetic knitting frame (23).

Figure 9:
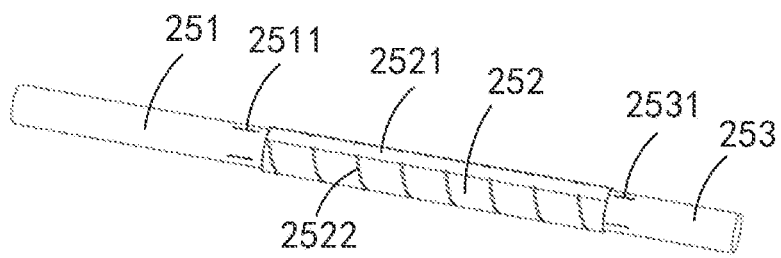
FIG. 9 is the schematic diagram of the rotating shaft in the motor of the disclosure.

Please refer to FIG. 9. The rotating shaft (25) comprises the first section (251), the second section (252) and the third section (253). The first section (251) and the third section (253) are respectively arranged at both ends of the second section (252). The first section (251), the second section (252), and the third section (253) are located on the same straight line. The first section (251) is provided with the first rib (2511). The first rib (2511) is used to accommodate adhesive. The rotor end plate (26) passing through the first section (251) is installed at the first rib (2511). The adhesive accommodated in the first rib (2511) is used to fix the rotor end plate (26) to the first section (251). The second section (252) is provided with a second straight portion (2521) and an adhesive slot (2522). The second straight portion (2521) extends from one end of the second section (252) to the other end of the second section (252). The second straight portion (2521) is used for mating and connecting with the first straight portion (222), so that after the iron core (22) is sleeved on the second section (252), the iron core (22) cannot rotate relative to the second section (252), but can only rotate synchronously with the second section (252). The adhesive slot (2522) is arranged spirally around the surface of the second section (252). The adhesive slot (2522) is used for accommodating the adhesive, in order to fix the iron core (22) sleeved in the second section (252) onto the second section (252), and to prevent the direction of the iron core (22) extending along the second section (252) (i.e. the axial direction of the second section (252)) away from the second section (252). It can be understood that, in the present disclosure, the spiral-shaped adhesive slot (2522) takes a connective structure from beginning to end. A plurality of annular adhesive slots (2522) are arranged on the surface of the second section (252) and are not connected to each other. The third section (253) is provided with a second rib (2531) which is used to accommodate the adhesive. The magnetic knitting frame (23) passing through the third section (253) is installed at the second rib (2531). The adhesive is used to fix the magnetic knitting frame (23) to the third section (253).

Please continue to refer to FIGS. 3 and 5. The rotor end plate (26) is provided with the first wire-embedding slot (261) which is arranged around the rotor end plate (26), and is used to accommodate the initial section (271) of the aramid fiber (27). This leads to the same diameters of the aramid fibers (27) wound around the surface of the rotor end plate (26), of the tile-shaped magnet (24), and of the magnetic knitting frame (23). In other words, the external diameter of the initial section (271) of the aramid fiber (27) is not greater than the external diameter of other portion of the aramid fiber (27), leading to a more reliable structure of the motor (100). Meanwhile, the consistency of external diameters of the aramid fiber (27) wound around the rotor assembly (20) ensures the more stable and secure operation of the rotor assembly (20) during rotation.

Please continue to refer to FIGS. 3 and 5. The rotor assembly (20) also comprises the first dynamic balancing member (28) and/or the second dynamic balancing member (29). At the time of debugging and assembling the electric motor (100), the first dynamic balancing member (28) may be provided at the rotor end plate (26), the second dynamic balancing member (29) is provided on the magnetic knitting frame (23), or the first dynamic balancing member (28) is only provided on the rotor end plate (26), or the second dynamic balancing member (29) is only provided on the magnetic knitting frame (23), according to actual situation. This allows the rotor assembly (20) to always maintain stable rotation, reduce the vibration amplitude of the rotor assembly (20) during rotation, and improve the performance of the electric motor (100). Both the first dynamic balancing member (28) and the second dynamic balancing member (29) are made of adhesive which can be directly applied on the rotor end plate (26) and/or the magnetic knitting frame (23).

Figure 10:
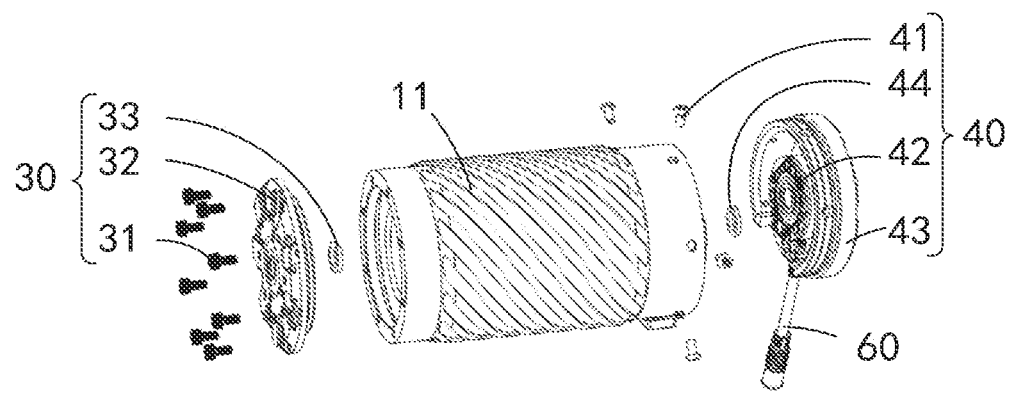
FIG. 10 is the exploded view of the front end cover assembly, the stator assembly, and the rear end cover assembly in the motor of the present disclosure.

For the aforesaid front end cover assembly (30), please refer to FIG. 10. The front end cover assembly (30) includes a front end fastener (31), a front cover plate (32) and a first bearing (33). The first bearing (33) is arranged on the front cover plate (32). The first bearing (33) allows the passage of the first section (251) of the rotating shaft (25), and the rotation of the first section (251). The front cover plate (32) is arranged on the first end of the housing (11) for covering and accommodating the first end of the receiving cavity (111). The front end fastener (31) is arranged around the front cover plate (32), and is used to fix the front cover plate (32) to the first end of the housing (11).

Figure 11:
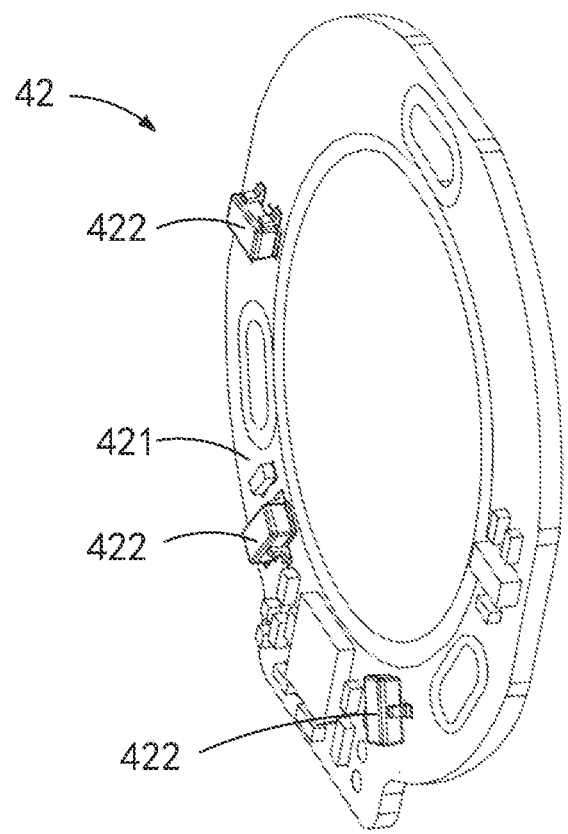
FIG. 11 is the schematic diagram of induction components in the motor of the present disclosure.

With respect to the foregoing rear end cover assembly (40), please refer to FIGS. 10 and 11. The rear end cover assembly (40) includes a rear end fastener (41), induction components (42), a rear cover plate 43, and a second bearing (44). The second bearing (44) and the induction components (42) are arranged on the rear cover (43). The second bearing (44) allows the passage of the third section (253) of the rotating shaft (25) and the rotation of the third section (253). The induction components (42) include a Printed Circuit Board Assembly (PCBA) board and Hall element (422). The Hall element (422) is arranged on the PCBA board (421) which is electrically connected to the data transmission line (60). The Hall element (422) is used to sense the magnetic pole information of the magnetic ring (21), thereby sensing the magnetic pole information of the tile-shaped magnet (24) which is transmitted to the external ESC device through the data transmission line (60). The external ESC device is used to adjust the power supply parameters delivered to the winding (12) through the three-phase power line (50) according to the magnetic pole information of the tile-shaped magnet (24), so that the winding (12) may generate a variable magnetic field to drive the rotation of the rotor assembly (20). The rear cover plate (43) is arranged on the second end of the housing (11) to cover and accommodate the second end of the receiving cavity (111). The rear end fastener (41) is arranged around the rear cover plate (43) to fix the rear cover plate (43) on the second end of the housing (11).

Please continue to refer to FIG. 1, the electric motor (100) also includes a preloading structure (70). The preloading structure (70) is sleeved on the first end of the rotating shaft (25), and is located between the rotor end plate (26) and the first bearing (33). Meanwhile, the preloading structure (70) serves as a cushion for the axial movement of the rotor assembly (20). This aims to reduce the gap between the rotor assembly (20) and the front end cover assembly (30), improve the stability of the rotor assembly (20) during rotation, and lower the noise generated during the operation of the electric motor (100). The preloading structure (70) includes a first gasket (71) and an elastic gasket (72). The elastic gasket (72) is adjacent to the rotor assembly (20). The first gasket (71) is adjacent to the first bearing (33) and is used for supporting the elastic gasket (72). The elastic gasket (72) transfers the axial elastic force to the rotor assembly (20).

The present disclosure has the following beneficial effects: the electric motor (100) includes a stator assembly (10), a rotor assembly (20), a front end cover assembly (30), a rear end cover assembly (40), a three-phase power line (50), and a data transmission line (60). The rotor assembly (20) is sleeved in the stator assembly (10). The front end cover assembly (30) and the rear end cover assembly (40) are disposed on both ends of the stator assembly (10), respectively. The two ends of the three-phase power line (50) are electrically connected to the stator assembly (10) and the external power supply, respectively. The two ends of the data transmission line (60) are electrically connected to the rear end cover assembly (40) and the external ESC device, respectively. The rotor assembly (20) includes a magnetic ring (21), a magnetic knitting frame (23), an iron core (22), several tile-shaped magnets (24), a rotating shaft (25) and a rotor end plate (26). The iron core (22) is sleeved on the rotating shaft (25), and is provided with a first installation slot (221). The tile-shaped magnet (24) is arranged in the first installation slot (221). The positioning slot (241) is arranged between two adjacent tile-shaped magnets (24). The rotor end plate (26) is sleeved on the rotating shaft (25), and is located on the first end of the iron core (22). The magnetic knitting frame (23) is sleeved on the rotating shaft (25), and is located on the second end of the iron core (22). One end of the magnetic knitting frame (23) is provided with a positioning boss (231) which is inserted into the positioning slot (241). The magnetic ring (21) is arranged on the other end of the magnetic knitting frame (23), so that the magnetic poles of the magnetic ring (21) corresponds to those of the tile-shaped magnets (24). The rear end cover assembly (40) includes induction components (42) which are used to sense the magnetic pole information of the magnetic ring (21) and the tile-shaped magnet (24) and to send the information to the external ESC device. The external ESC device may adjust the power supply of the external power source to the stator assembly (10) according to the magnetic pole information. A positioning slot (241) is arranged between adjacent tile-shaped magnets (24). The magnetic knitting frame (23) is provided with a positioning boss (231) that is inserted into the structure of the positioning slot (241). The electric motor (100) allows the accurate positioning and assembling of the rotor assembly (20), so that the magnetic poles of the magnetic ring (21) corresponds to the magnetic poles of the tile-shaped magnet (24). This improves the positioning accuracy of the rotor assembly (20) of the motor, enhances the accuracy of the induction components (42) used for sensing the tile-shaped magnet (24), leading to the better performance of the electric motor (100).

The disclosure also provides an electric toy that comprises the aforesaid electric motor (100). The electric motor (100) is used to power the electric toy. Electric toys include drones, remote control cars, electric fans, and other devices that require the electric motor (100) as a power source. For the structure and function of the electric motor (100), reference may be made to the aforesaid electric motor (100) without further elaboration here.

The foregoing is only an embodiment of the disclosure, and therefore does not restrict the scope of the patent stated in the disclosure. The variation of the equivalent structure or equivalent flow process in the Specification and the Drawings of the disclosure, or directly or indirectly used in other relevant technical fields may fall within the scope of patent protection of the present disclosure.

The invention claimed is:

1. An electric motor comprising:
   a stator assembly, comprising a housing and a winding; the housing is provided with a receiving cavity, and the winding is accommodated in the receiving cavity;
   a rotor assembly, sleeved in the winding, the rotor assembly comprises a magnetic ring, a magnetic knitting frame, an iron core, several tile-shaped magnets, a rotating shaft, aramid fiber, and a rotor end plate, the iron core is provided with a first installation slot, a positioning slot is arranged between two adjacent tile-shaped magnets, the aramid fiber is wound around the outer surface of the several tile-shaped magnets, the rotor end plate is sleeved on the rotating shaft, and is arranged on the first end of the iron core, the magnetic knitting frame is sleeved on the rotating shaft, and is located on the second end of the iron core, one end of the magnetic knitting frame is provided with a positioning boss which is inserted into the positioning slot, the magnetic ring is arranged on the other end of the magnetic knitting frame, the rotor end plate is provided with a first wire-embedding slot, the magnetic knitting frame is provided with a second wire-embedding slot, a wire outlet and a threaded hole, the wire outlet is arranged on the wall of the second wire-embedding slot; the first and second wire-embedding slots are used for accommodating the initial and final sections of the aramid fiber, respectively the final section of the aramid fiber goes through the wire outlet and is fixed to the threaded hole after being led out, the number of the threaded hole is at least one, and the threaded hole is arranged at the central portion of the magnetic knitting frame;
   a front end cover assembly, comprising a front end fastener and a front cover plate, the front cover plate is arranged on the first end of the housing, and the front end fastener is used for fixing the front cover plate to the housing;
   a rear end cover assembly, comprising a rear end fastener, induction components and a rear cover plate the induction components are arranged on the rear cover plate, and are used for sensing the magnetic ring, the rear end fastener is used for fixing the rear cover to the second end of the housing;
   a three-phase power line, electrically connected to the winding;
   a data transmission line, one end of which is electrically connected to induction components and the other end of which is electrically connected to an external electronic speed control (ESC) device.

2. The electric motor stated in claim 1, wherein the iron core is provided with a first straight portion;
   the rotating shaft comprises a first section, a second section and a third section; the first section and the third section are respectively located at both ends of the second section; the second section is provided with a second straight portion; the first straight portion is connected to the second straight portion so as to locate the iron core on the second section of the rotating shaft; the rotor end plate is sleeved on the first section, and the magnetic knitting frame is sleeved on the third section.

3. The electric motor stated in claim 2, wherein the second section is provided with an adhesive slot, the end of the first section adjacent to the second section is provided with a first rib, the end of the third section adjacent to the second section is provided with a second rib, the adhesive slot as well as the first and second ribs are all used to store adhesive.

4. The electric motor stated in claim 2, wherein the other end of the magnetic knitting frame is provided with a second installation slot, and the bottom of the second installation slot is provided with a positioning hole;

the magnetic ring is arranged at the second installation slot, and is provided with a positioning strut, the positioning strut is inserted into the positioning hole, the magnetic poles of the magnetic ring correspond to the magnetic poles on the outer surface of the several tile-shaped magnets.

5. The electric motor stated in claim 1, wherein the rotor assembly further comprises a first dynamic balancing member and a second dynamic balancing member, the first and second dynamic balancing members are arranged on the rotor end plate, and on the magnetic knitting frame, respectively.

6. The electric motor stated in claim 1, wherein the front end cover assembly further comprises a first bearing which is arranged on the front cover plate, and is used for supporting the first section of the rotating shaft;

the rear end cover assembly further comprises a second bearing which is arranged on the rear cover plate, and is used for supporting the third section of the rotating shaft.

7. The electric motor stated in claim 6, wherein the electric motor further comprises a preloading structure disposed between the rotor assembly and the front end cover assembly, the preloading structure serves as a cushion for the axial movement of the rotor assembly.

8. An electric toy comprising the electric motor of claim 1, wherein the electric motor is used to power the electric toy.

9. The electric toy of claim 8 wherein, the iron core is provided with a first straight portion;

the rotating shaft comprises a first section, a second section and a third section; the first section and the third section are respectively located at both ends of the second section; the second section is provided with a second straight portion; the first straight portion is connected to the second straight portion so as to locate the iron core on the second section of the rotating shaft; the rotor end plate is sleeved on the first section, and the magnetic knitting frame is sleeved on the third section.

10. The electric toy of claim 9 wherein, the second section is provided with an adhesive slot, the end of the first section adjacent to the second section is provided with a first rib, the end of the third section adjacent to the second section is provided with a second rib, the adhesive slot as well as the first and second ribs are all used to store adhesive.

11. The electric toy of claim 9 wherein, the other end of the magnetic knitting frame is provided with a second installation slot, and the bottom of the second installation slot is provided with a positioning hole;

the magnetic ring is arranged at the second installation slot, and is provided with a positioning strut, the positioning strut is inserted into the positioning hole, the magnetic poles of the magnetic ring correspond to the magnetic poles on the outer surface of the several tile-shaped magnets.

12. The electric toy of claim 8 wherein, the rotor assembly further comprises a first dynamic balancing member and a second dynamic balancing member, the first and second dynamic balancing members are arranged on the rotor end plate, and on the magnetic knitting frame, respectively.

13. The electric toy of claim 8, wherein the front end cover assembly further comprises a first bearing which is arranged on the front cover plate, and is used for supporting the first section of the rotating shaft;

the rear end cover assembly further comprises a second bearing which is arranged on the rear cover plate, and is used for supporting the third section of the rotating shaft.

14. The electric toy of claim 13, wherein the electric motor further comprises a preloading structure disposed between the rotor assembly and the front end cover assembly, the preloading structure serves as a cushion for the axial movement of the rotor assembly.

\* \* \* \* \*